(12) United States Patent
Wang

(10) Patent No.: US 11,012,009 B2
(45) Date of Patent: May 18, 2021

(54) MOTOR DRIVE DEVICE

(71) Applicant: OMRON Corporation, Kyoto (JP)

(72) Inventor: Shengpei Wang, Kusatsu (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 16/644,566

(22) PCT Filed: Oct. 5, 2018

(86) PCT No.: PCT/JP2018/037461
§ 371 (c)(1),
(2) Date: Mar. 5, 2020

(87) PCT Pub. No.: WO2019/078045
PCT Pub. Date: Apr. 25, 2019

(65) Prior Publication Data
US 2021/0067065 A1 Mar. 4, 2021

(30) Foreign Application Priority Data
Oct. 20, 2017 (JP) .............................. JP2017-204041

(51) Int. Cl.
*H02P 3/22* (2006.01)
(52) U.S. Cl.
CPC ....................................... *H02P 3/22* (2013.01)
(58) Field of Classification Search
CPC ........................................................ H02P 3/22
USPC ................ 318/379, 299, 508, 509, 515, 528
See application file for complete search history.

(56) References Cited

U.S. PATENT DOCUMENTS

| | | | | |
|---|---|---|---|---|
| 3,715,642 A | * | 2/1973 | Walter | D05B 69/22 318/269 |
| 4,847,515 A | * | 7/1989 | Nakach | H03F 3/3437 327/484 |
| 4,905,300 A | * | 2/1990 | Bhagwat | H02P 25/145 388/800 |

(Continued)

FOREIGN PATENT DOCUMENTS

| | | |
|---|---|---|
| JP | 2013-179741 A | 9/2013 |
| JP | 2014-161221 A | 9/2014 |

(Continued)

OTHER PUBLICATIONS

English translation of the International Search Report("ISR") of PCT/JP2018/037461 dated Jan. 8, 2019.
Written Opinion("WO") of PCT/JP2018/037461 dated Jan. 8, 2019.

*Primary Examiner* — Jorge L Carrasquillo
(74) *Attorney, Agent, or Firm* — Metrolex IP Law Group, PLLC

(57) ABSTRACT

A long-life motor driving device is realized. A motor driving device (11) includes: a motor driving circuit (3) configured to supply an alternating electric current to a motor (2); and a dynamic braking circuit (4). The dynamic braking circuit includes: a mechanical switch (SW2) configured to cause a short circuit between windings corresponding to respective two phases; a semiconductor switch (SW1) connected to the mechanical switch in parallel and configured to cause a short circuit between the windings corresponding to the respective two phases; and a first impedance circuit (Z1) connected to the semiconductor switch in series.

15 Claims, 9 Drawing Sheets

(56) References Cited

U.S. PATENT DOCUMENTS

| | | | | |
|---|---|---|---|---|
| 4,922,161 A * | 5/1990 | Gilliland | .................. | H02P 3/14 |
| | | | | 318/269 |
| 4,992,904 A * | 2/1991 | Spencer | ................. | H01H 9/542 |
| | | | | 361/13 |
| 2006/0192506 A1* | 8/2006 | Miffit | ....................... | B62K 9/02 |
| | | | | 318/55 |
| 2012/0218676 A1* | 8/2012 | Demetriades | .......... | H01H 9/542 |
| | | | | 361/115 |
| 2013/0221888 A1 | 8/2013 | Horikoshi et al. | | |
| 2016/0226407 A1* | 8/2016 | Saitou | ................. | H02P 29/0241 |
| 2017/0063279 A1* | 3/2017 | Tateda | ................. | H02P 29/024 |

FOREIGN PATENT DOCUMENTS

| | | |
|---|---|---|
| JP | 2016-144232 A | 8/2016 |
| JP | 2017-046492 A | 3/2017 |

* cited by examiner

MOTOR DRIVE DEVICE

TECHNICAL FIELD

The present invention relates to a motor driving device.

BACKGROUND ART

Synchronous motors are used for machine tools, industrial machines, industrial robots, and the like. By causing short circuits between motor windings, it is possible to apply dynamic brakes to the synchronous motors.

Patent Literature 1 discloses a motor driving device including: an inverter for driving a motor; and a switching device for causing a short circuit between windings of the motor. The motor driving device is configured such that, in a case where a dynamic brake is applied, all of semiconductor switches provided to one of arms in the inverter are first turned off, and then all of semiconductor switches provided to the other of the arms in the inverter are turned on. Subsequently, according to the motor driving device, the switching device is turned on so that the dynamic brake is applied.

CITATION LIST

Patent Literature

Patent Literature 1

Japanese Patent Application Publication, Tokukai, No. 2013-179741

SUMMARY OF INVENTION

Technical Problem

However, according to the motor driving device of Patent Literature 1, the semiconductor switches are provided inside the inverter, for generation of an alternating electric current. Therefore, there is a problem that, in a case where the inverter itself breaks, it is not possible to apply the dynamic brake. Moreover, it is not possible to provide, for example, a resistor to a path passing through the semiconductor switches, in order to make resistance of the path as low as possible. As such, in a case where all of the semiconductor switches provided to the other of the arms are turned on when the dynamic brake is applied, a high electric current flows to the semiconductor switches and the motor. This causes the semiconductor switches or the motor to generate heat, resulting in a breakdown. Further, using high-capacity semiconductor switches to avoid breakdowns of the semiconductor switches leads to an increase in production cost and an increase in size of the motor driving device.

In a case where the semiconductor switches provided inside the inverter are not turned on when the dynamic brake is applied, an arc discharge may occur when a mechanical switch of a dynamic braking circuit is turned on. This causes a problem that a contact point of the mechanical switch is worn out.

An object of an aspect of the present disclosure is to realize a long-life motor driving device.

Solution to Problem

A motor driving device in accordance with an aspect of the present disclosure is a motor driving device which drives a motor, including: a motor driving circuit configured to supply an alternating electric current to the motor so that the motor is driven; and a dynamic braking circuit provided between windings of the motor which windings correspond to respective two phases, the dynamic braking circuit including: a mechanical switch configured to cause a short circuit between the windings corresponding to the respective two phases; a semiconductor switch connected to the mechanical switch in parallel and configured to cause a short circuit between the windings corresponding to the respective two phases; and a first impedance circuit connected to the semiconductor switch in series.

Advantageous Effects of Invention

According to an aspect of the present disclosure, it is possible to extend a life of a motor driving device.

DESCRIPTION OF EMBODIMENTS

Embodiment 1

Configuration of Motor Driving Device 11

Figure 1:
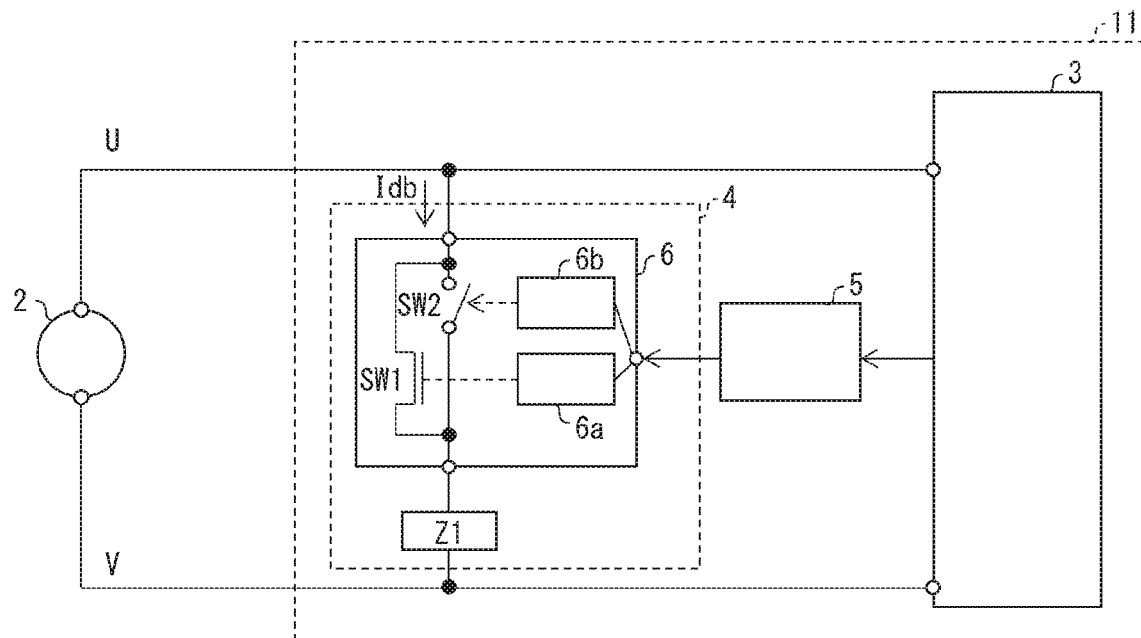
FIG. 1 is a single-phase circuit diagram illustrating a configuration of a motor driving device in accordance with an aspect of the present disclosure.

FIG. 1 is a single-phase circuit diagram illustrating a configuration of a motor driving device 11 in accordance with Embodiment 1. A motor 2 is, for example, a three-phase synchronous motor. FIG. 1 illustrates a circuit for two phases (U-V), out of three phases (U phase, V phase, and W phase), for brevity. The motor driving device 11 drives the motor 2. The motor driving device 11 includes a motor driving circuit 3, a dynamic braking circuit 4, and a braking control circuit 5 (control circuit).

The motor driving circuit 3 has, for example, an inverter circuit which generates an alternating electric current. The motor driving circuit 3 supplies the alternating electric current to the motor 2 so that the motor 2 is driven. The motor driving circuit 3 functions as a control device which controls rotation of the motor 2 and as an alternating-current power source for the motor 2. The motor driving circuit 3 is connected to windings of the motor 2 which windings correspond to the respective two phases.

The dynamic braking circuit 4 causes a short circuit between the windings corresponding to the respective two phases (U-V) in a case of, for example, emergency so that a dynamic brake is applied to the motor 2. The dynamic braking circuit 4 includes a relay 6 and a first impedance circuit Z1. The relay 6 includes a semiconductor switch SW1, a mechanical switch SW2, a first control circuit 6a, and a second control circuit 6b. The first control circuit 6a controls the semiconductor switch SW1 to be turned on or off (conductive/non-conductive). The second control circuit 6b controls the mechanical switch SW2 to be turned on or off (conductive/non-conductive). The first control circuit 6a and the semiconductor switch SW1 constitute a solid-state relay. The second control circuit 6b and the mechanical switch SW2 constitute a mechanical relay. Each of the first control circuit 6a and the second control circuit 6b can include, for example, a timer circuit. The semiconductor switch SW1 is a switching element such as a transistor. The mechanical switch SW2 is a switch having contact points.

One of ends of the semiconductor switch SW1 is connected to the winding corresponding to the U phase (hereinafter, referred to as a U-phase winding), and the other of the ends of the semiconductor switch SW1 is connected to one of ends of the first impedance circuit Z1. One of ends of the mechanical switch SW2 is connected to the U-phase winding, and the other of the ends of the mechanical switch SW2 is connected to the one of the ends of the first impedance circuit Z1. The semiconductor switch SW1 and the mechanical switch SW2 are connected to each other in parallel. The other of the ends of the first impedance circuit Z1 is connected to the winding corresponding to the V phase (hereinafter, referred to as a V-phase winding). Each of the semiconductor switch SW1 and the mechanical switch SW2 causes a short circuit between the windings corresponding to the respective two phases (U-V) in a case where the each of the semiconductor switch SW1 and the mechanical switch SW2 is in an ON state.

Note that a circuit similar to the dynamic braking circuit 4 can be provided between the V-phase winding and a winding corresponding to the W phase (W-phase winding).

The braking control circuit 5 is connected to a control terminal of the relay 6 via, for example, a single signal line. The braking control circuit 5 outputs a control signal to the relay 6 on the basis of a braking signal received from the motor driving circuit 3.

The first impedance circuit Z1 can include a resistor and/or a capacitor element which are/is connected to the semiconductor switch SW1 and the mechanical switch SW2 in series. For example, the resistor and the capacitor element can be connected to each other in parallel.

Operation of Motor Driving Device 11

While the motor driving circuit 3 is causing the motor 2 to be driven, each of the semiconductor switch SW1 and the mechanical switch SW2 is in an OFF state, and an alternating electric current for driving the motor 2 is supplied from the motor driving circuit 3 to the motor 2.

For example, in a case where a user operates an emergency stop button or an abnormality occurs in a circuit of part of the motor driving circuit 3, the motor driving circuit 3 starts to bring the motor 2 to an emergency stop. The motor driving circuit 3 stops supplying the alternating electric current to the motor 2, and outputs a braking signal to the braking control circuit 5. The braking control circuit 5 having received the braking signal outputs, to the relay 6, a control signal which causes both of the semiconductor switch SW1 and the mechanical switch SW2 to be turned on.

The control signal which the relay 6 has received is inputted into both of the first control circuit 6a and the second control circuit 6b. In Embodiment 1, a timer circuit (delay circuit) of each of the first control circuit 6a and the second control circuit 6b is configured such that the first control circuit 6a first controls the semiconductor switch SW1 to be turned on and then, after a given length of time, the second control circuit 6b controls the mechanical switch SW2 to be turned on. The first control circuit 6a does not need to include the timer circuit so as to operate quickly. The first control circuit 6a thus controls the semiconductor switch SW1 to be turned on in accordance with the control signal. Thereafter, the second control circuit 6b controls the mechanical switch SW2 to be turned on in accordance with the control signal.

The motor 2 continues to rotate by inertia of a load, even in a case where the motor driving circuit 3 stops supplying the alternating electric current to the motor 2. Therefore, the motor 2 operates as a power generator, and generates an alternating electric current which is to flow through the dynamic braking circuit 4 and then flow through the motor 2.

A case will be considered where the semiconductor switch SW1 is in the ON state and the mechanical switch SW2 is in the OFF state. A motor electric current Idb (alternating electric current) having been generated in the motor 2 flows from the U-phase winding to the V-phase winding (or from the V-phase winding to the U-phase winding) through the semiconductor switch SW1 and the first impedance circuit Z1 of the dynamic braking circuit 4. By the motor electric current Idb flowing through the motor 2, a braking force acts on the motor 2. Rotational energy of the motor 2 is converted into Joule heat by the motor electric current Idb flowing through the first impedance circuit Z1. Note that, also in the motor 2, Joule heat corresponding to an internal impedance of the motor 2 is generated. Note, however, that an impedance of the first impedance circuit Z1 is greater than the internal impedance of the motor 2, and the rotational energy is mainly converted into Joule heat in the first impedance circuit Z1. It is therefore possible to prevent the motor 2 from generating heat, and possible to prevent the motor 2 from breaking.

Thereafter, in addition to the semiconductor switch SW1, the mechanical switch SW2 is also turned on. Immediately after the mechanical switch SW2 is turned on, chattering can occur in the mechanical switch SW2. In this case, since the semiconductor switch SW1 is in a conductive state, a voltage between the contact points of the mechanical switch SW2 is substantially 0 (zero). Therefore, it is possible to prevent an arc discharge from occurring between the contact points of the mechanical switch SW2, even in a case where chattering occurs. The timer circuit of the second control circuit 6b is configured such that the mechanical switch SW2 is turned on after the semiconductor switch SW1 is turned on. The motor electric current Idb having been generated in the motor 2 flows from the U-phase winding to the V-phase winding (or from the V-phase winding to the U-phase winding) through the semiconductor switch SW1 and the mechanical switch SW2 of the dynamic braking circuit 4 and through the first impedance circuit Z1 of the dynamic braking circuit 4.

There is substantially no variation, in impedance of a path along which the motor electric current Idb flows, between before and after the mechanical switch SW2 is turned on. The braking force corresponding to the motor electric current Idb continues to act on the motor 2. The braking control circuit 5 controls the semiconductor switch SW1 to remain on even after the mechanical switch SW2 is turned on. The braking control circuit 5 can control the semiconductor switch SW1 and the mechanical switch SW2 to remain on, for example, until the motor 2 stops. For example, the braking control circuit 5 only needs to be configured to control the semiconductor switch SW1 and the mechanical switch SW2 to remain on for a sufficiently long time, on the basis of a maximum load connected to the motor 2 and a maximum rotational speed of the motor 2. Alternatively, the braking control circuit 5 can control the semiconductor switch SW1 and the mechanical switch SW2 to remain on while the braking control circuit 5 is receiving a stop signal from the motor driving circuit 3. This causes (i) part of the motor electric current Idb to flow though the semiconductor switch SW1 and (ii) the other part of the motor electric current Idb to flow through the mechanical switch SW2. It is therefore possible to cause an electric current flowing through the semiconductor switch SW1 to be lower, and possible to cause an electric current flowing through the mechanical switch SW2 to be lower.

Unless the first impedance circuit Z1 is provided in series with the semiconductor switch SW1, a high motor electric current Idb flows through the semiconductor switch SW1, so that a braking force corresponding to the high motor electric current Idb acts on the motor 2.

According to the motor driving device 11, the first impedance circuit Z1 is connected to the semiconductor switch SW1 in series. Therefore, it is possible to adjust a magnitude of the motor electric current Idb also while merely the semiconductor switch SW1 is being in the ON state. This makes it possible to prevent heat generation in the semiconductor switch SW1. Moreover, depending on the magnitude of the motor electric current Idb, it is possible to adjust the braking force acting on the motor 2. Furthermore, the braking force acts on the motor 2 also while merely the semiconductor switch SW1 is being in the ON state. This causes a decrease in rotational speed of the motor 2, and accordingly causes a decrease in motor electric current Idb. Thereafter, the mechanical switch SW2 is turned on. Therefore, it is possible to cause a decrease in maximum electric current flowing through the mechanical switch SW2.

Thus, it is possible to use the semiconductor switch SW1 and/or the mechanical switch SW2 each of which is low in rated electric current (each of which has a small capacity). That is, it is possible to use the semiconductor switch SW1 and/or the mechanical switch SW2 each of which has a reduced size.

According to the motor driving device 11, the motor electric current Idb having been generated during dynamic braking does not flow through the motor driving circuit 3, which includes the inverter circuit. The rotational energy of the motor 2 is consumed (converted into Joule heat) mainly in the first impedance circuit Z1 through which no electric current flows while the motor 2 is being ordinarily driven. Therefore, it is possible to prevent heat generation in the motor driving circuit 3 and the motor 2 during the dynamic braking. Thus, it is possible to prevent a breakdown of the motor driving circuit 3, which drives the motor 2, and a breakdown of the motor 2. Accordingly, it is possible to extend a life of the motor driving device 11.

Variation

Figure 8:
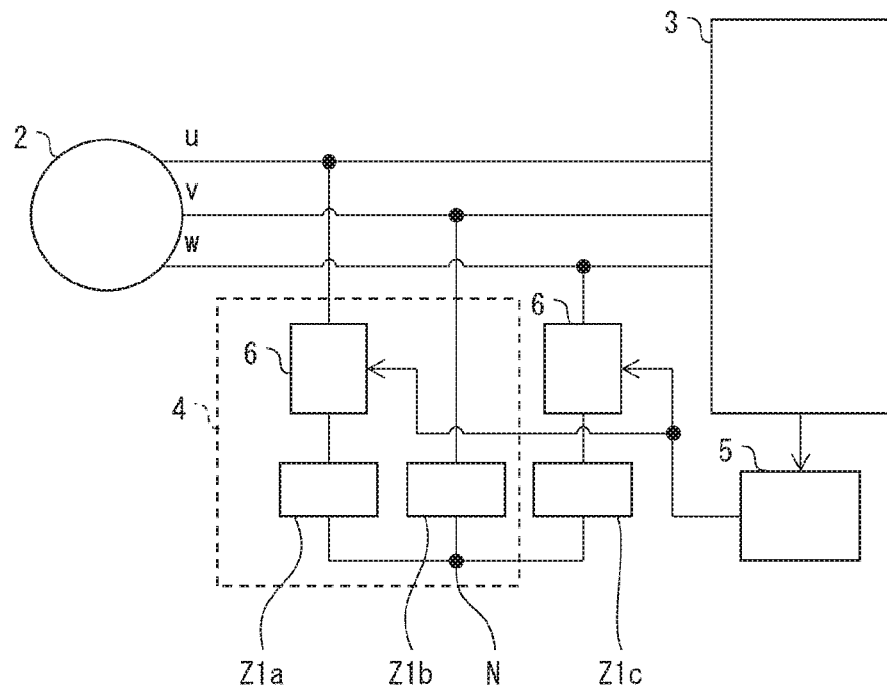
FIG. 8 is a three-phase circuit diagram illustrating a configuration of a motor driving device in accordance with an aspect of the present disclosure.

FIG. 8 is a three-phase circuit diagram illustrating a configuration of a motor driving device 11 in accordance with a variation. A relay 6, an impedance circuit Z1a, and an impedance circuit Z1b are connected in this order between a U-phase winding and a V-phase winding. Another relay 6 and an impedance circuit Z1c are connected between a W-phase winding and a node N (node between the impedance circuit Z1a and the impedance circuit Z1b). An impedance of each of the impedance circuits Z1a, Z1b, and Z1c is half that of the first impedance circuit Z1. The relay 6 and the impedance circuits Z1a and Z1b correspond to a dynamic braking circuit 4.

Figure 9:
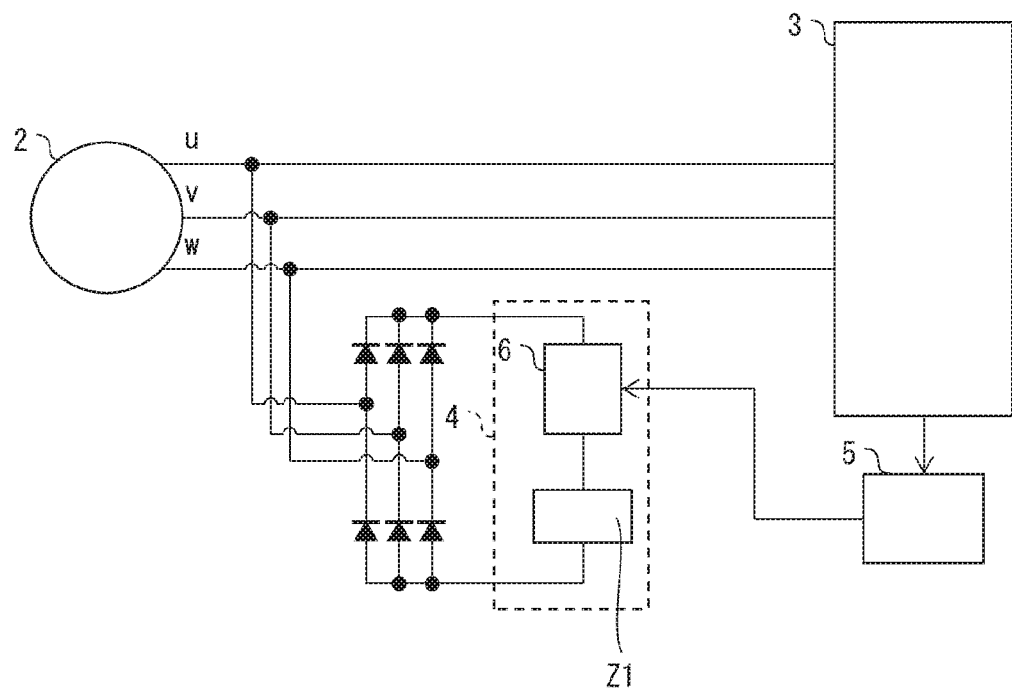
FIG. 9 is a three-phase circuit diagram illustrating a configuration of a motor driving device in accordance with an aspect of the present disclosure.

FIG. 9 is a three-phase circuit diagram illustrating a configuration of a motor driving device 11 in accordance with a variation. A diode is connected between a relay 6 and each of windings corresponding to respective phases. Another diode is connected between a first impedance circuit Z1 and the each of the windings corresponding to the respective phases. These diodes are identical to each other in direction.

Embodiment 2

Embodiment 2 of the present invention will be described below. Note that, for convenience, members having functions identical to those of members described in Embodiment 1 will be given identical reference signs, and will be not described.

Configuration of Motor Driving Device 12

Figure 2:
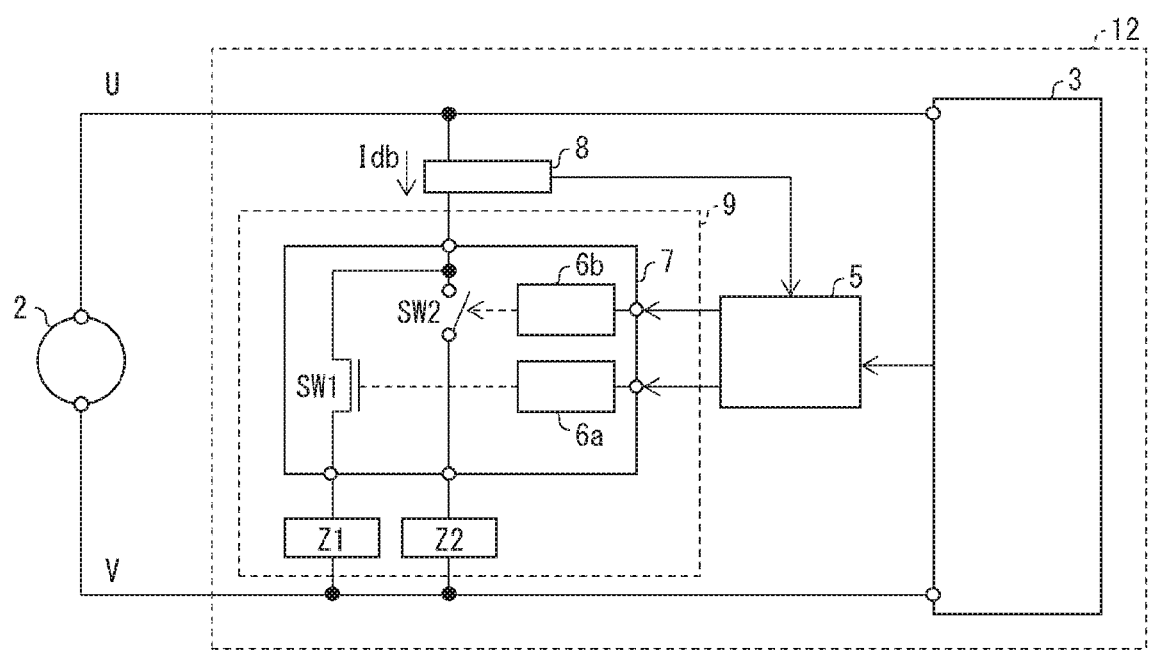
FIG. 2 is a single-phase circuit diagram illustrating a configuration of a motor driving device in accordance with an aspect of the present disclosure.

FIG. 2 is a single-phase circuit diagram illustrating a configuration of a motor driving device 12 in accordance with Embodiment 2. The motor driving device 12 drives a motor 2. The motor driving device 12 includes a motor driving circuit 3, a dynamic braking circuit 9, a braking control circuit 5 (control circuit), and a speed measuring circuit 8.

The dynamic braking circuit 9 includes a relay 7, a first impedance circuit Z1, and a second impedance circuit Z2. The relay 7 includes a semiconductor switch SW1, a mechanical switch SW2, a first control circuit 6a, and a second control circuit 6b. The first control circuit 6a controls the semiconductor switch SW1 to be turned on or off (conductive/non-conductive). The second control circuit 6b controls the mechanical switch SW2 to be turned on or off (conductive/non-conductive). Unlike the relay 6 in Embodiment 1, the relay 7 separately has (i) an input terminal via which a control signal is inputted into the first control circuit 6a and (ii) an input terminal via which a control signal is inputted into the second control circuit 6b. Further, the relay 7 separately has (i) an external terminal connected to the semiconductor switch SW1 and (ii) an external terminal connected to the mechanical switch SW2.

One of ends of the semiconductor switch SW1 is connected to a U-phase winding, and the other of the ends of the semiconductor switch SW1 is connected to one of ends of the first impedance circuit Z1. One of ends of the mechanical switch SW2 is connected to the U-phase winding, and the other of the ends of the mechanical switch SW2 is connected to one of ends of the second impedance circuit Z2. A set of the semiconductor switch SW1 and the first impedance circuit Z1 and a set of the mechanical switch SW2 and the second impedance circuit Z2 are connected to each other in parallel. The other of the ends of the first impedance circuit Z1 and the other of the ends of the second impedance circuit Z2 are connected to a V-phase winding. In Embodiment 2, an impedance of the first impedance circuit Z1 and an impedance of the second impedance circuit Z2 are different from each other.

Note that a circuit similar to the dynamic braking circuit 9 can be provided between the V-phase winding and a W-phase winding.

The braking control circuit 5 is connected to two control terminals of the relay 7 via, for example, two signal lines. The braking control circuit 5 individually outputs, to the relay 7, (i) a control signal for the semiconductor switch SW1 and (ii) a control signal for the mechanical switch SW2, on the basis of a braking signal received from the motor driving circuit 3.

The first impedance circuit Z1 can include a resistor and/or a capacitor element which are/is connected to the semiconductor switch SW1 in series. The second impedance circuit Z2 can include a resistor and/or a capacitor element which are/is connected to the mechanical switch SW2 in series. For example, each of these resistors can be connected to a corresponding one of these capacitor elements in parallel.

The speed measuring circuit 8 measures a rotational speed of the motor 2. The speed measuring circuit 8, for example, measures a motor electric current Idb flowing through the motor 2, and measures the rotational speed of the motor 2 in accordance with the motor electric current Idb. The speed measuring circuit 8 can calculate the rotational speed of the motor 2 from a frequency of the motor electric current Idb. The speed measuring circuit 8 is provided on a path along which the motor electric current Idb flows through the motor 2. In Embodiment 2, the speed measuring circuit 8 is provided between the U-phase winding and the dynamic braking circuit 9. Note, however, that a location where the speed measuring circuit 8 is provided is not limited to such a location. Alternatively, the speed measuring circuit 8 can be provided between (i) a node at which a path to the motor driving circuit 3 and a path to the dynamic braking circuit 9 join and (ii) the motor 2. In the latter case, it is possible to also measure the rotational speed while the motor 2 is being ordinarily driven. Note that the speed measuring circuit 8 can directly measure the rotational speed of the motor 2 by any other means (such as optical means). The speed measuring circuit 8 notifies the braking control circuit 5 (and the motor driving circuit 3) of the rotational speed of the motor 2 thus measured.

Operation of Motor Driving Device 12

While the motor driving circuit 3 is causing the motor 2 to be driven, each of the semiconductor switch SW1 and the mechanical switch SW2 is in an OFF state, and an alternating electric current for driving the motor 2 is supplied from the motor driving circuit 3 to the motor 2.

For example, in a case where a user operates an emergency stop button or an abnormality occurs in a circuit of part of the motor driving circuit 3, the motor driving circuit 3 starts to bring the motor 2 to an emergency stop. The motor driving circuit 3 stops supplying the alternating electric current to the motor 2, and outputs a braking signal to the braking control circuit 5. The braking control circuit 5 individually controls timings at which the semiconductor switch SW1 and the mechanical switch SW2 are turned on, depending on the rotational speed of the motor 2. The braking control circuit 5 having received the braking signal first outputs, to the relay 7, a control signal which causes merely the semiconductor switch SW1 to be turned on.

The control signal for the semiconductor switch SW1, which control signal has been received by the relay 7, is inputted into the first control circuit 6a. The first control circuit 6a controls the semiconductor switch SW1 to be turned on upon receipt of the control signal.

A case will be considered where the semiconductor switch SW1 is in an ON state and the mechanical switch SW2 is in the OFF state. The motor electric current Idb having been generated in the motor 2 flows from the U-phase winding to the V-phase winding (or from the V-phase winding to the U-phase winding) through the semiconductor switch SW1 and the first impedance circuit Z1 of the dynamic braking circuit 9. By the motor electric current Idb flowing through the motor 2, a braking force acts on the motor 2. Rotational energy of the motor 2 is converted into Joule heat by the motor electric current Idb flowing through the first impedance circuit Z1. This causes a decrease in rotational speed of the motor 2, and accordingly causes a decrease in motor electric current Idb.

Thereafter, in a case where a measured rotational speed of the motor 2 becomes equal to or lower than a given value, the braking control circuit 5 then outputs, to the relay 7, a control signal which causes the mechanical switch SW2 to be turned on.

The control signal for the mechanical switch SW2, which control signal has been received by the relay 7, is inputted into the second control circuit 6b. The second control circuit 6b controls the mechanical switch SW2 to be turned on upon receipt of the control signal.

A case will be considered where both of the semiconductor switch SW1 and the mechanical switch SW2 are in the ON state. When the mechanical switch SW2 is turned on, the semiconductor switch SW1 is in the ON state. Therefore, it is possible to prevent an arc discharge from occurring between contact points of the mechanical switch SW2, even in a case where chattering occurs. The motor electric current Idb having been generated in the motor 2 flows from the U-phase winding to the V-phase winding (or from the V-phase winding to the U-phase winding) in such a manner that (i) part of the motor electric current Idb flows along a path passing through the semiconductor switch SW1 and the first impedance circuit Z1 of the dynamic braking circuit 9 and (ii) the other part of the motor electric current Idb flows along a path passing through the mechanical switch SW2 and the second impedance circuit Z2 of the dynamic braking circuit 9. The motor electric current Idb flows through both of the first impedance circuit Z1 and the second impedance circuit Z2.

After a given length of time has elapsed since the braking control circuit 5 controlled the mechanical switch SW2 to be turned on, the braking control circuit 5 outputs, to the relay 7, a control signal which causes the semiconductor switch SW1 to be turned off. The first control circuit 6a controls the semiconductor switch SW1 to be turned off, on the basis of the control signal. The above given length of time is preset so that the semiconductor switch SW1 is turned off after chattering of the mechanical switch SW2 ends.

Figure 3:
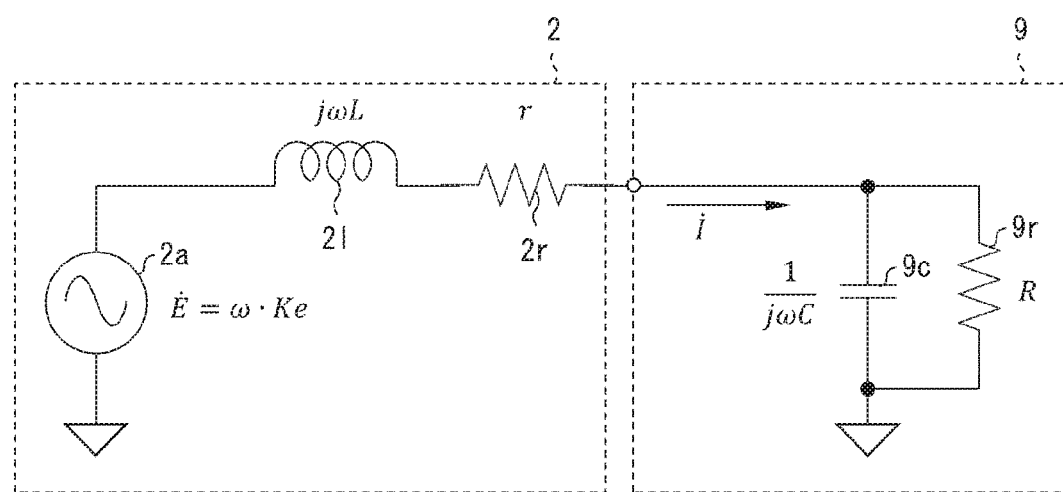
FIG. 3 is a circuit diagram illustrating a single-phase equivalent circuit of a circuit including a motor and a dynamic braking circuit during dynamic braking.

FIG. 3 is a circuit diagram illustrating a single-phase equivalent circuit of a circuit including the motor 2 and the dynamic braking circuit 9 during dynamic braking. An equivalent circuit of the motor 2 includes an alternating-current power source 2a, a coil 2l, and a resistor 2r which are connected in series. An equivalent circuit of the dynamic braking circuit 9 includes a resistor 9r and a capacitor 9c which are connected in parallel. The resistor 9r and the capacitor 9c are for expressing a total impedance of the dynamic braking circuit 9. "E (vector)" indicates a counter electromotive force (induced voltage) of the motor 2. "ω" indicates the rotational speed of the motor 2. "Ke" indicates an induced voltage constant. "L" indicates an inductance of the coil 2l (winding) (an inductance of the winding). "r" indicates a resistance of the resistor 2r (resistance of the winding). "I (vector)" indicates an electric current flowing through the dynamic braking circuit 9. "1/jωC" indicates an impedance of the capacitor 9c. "R" indicates a resistance of the resistor 9r. "j" indicates an imaginary unit. An impedance of the motor 2 is jωL+r. An impedance of the dynamic braking circuit 9 is $(R/(1+\omega^2C^2R^2)-j\omega\cdot CR^2/(1+\omega^2C^2R^2))$. A power factor is cos θ. Real power is E·I·cos θ.

As the power factor cos θ becomes higher, the dynamic braking circuit 9 is capable of applying a brake more efficiently. In a case where $L=CR^2/(1+\omega^2C^2R^2)$, the power factor cos θ=1. An appropriate relationship among L, C, and R which appropriate relationship allows the power factor to be high varies depending on the rotational speed ω.

Control Timing in Embodiment 1

Figure 4:
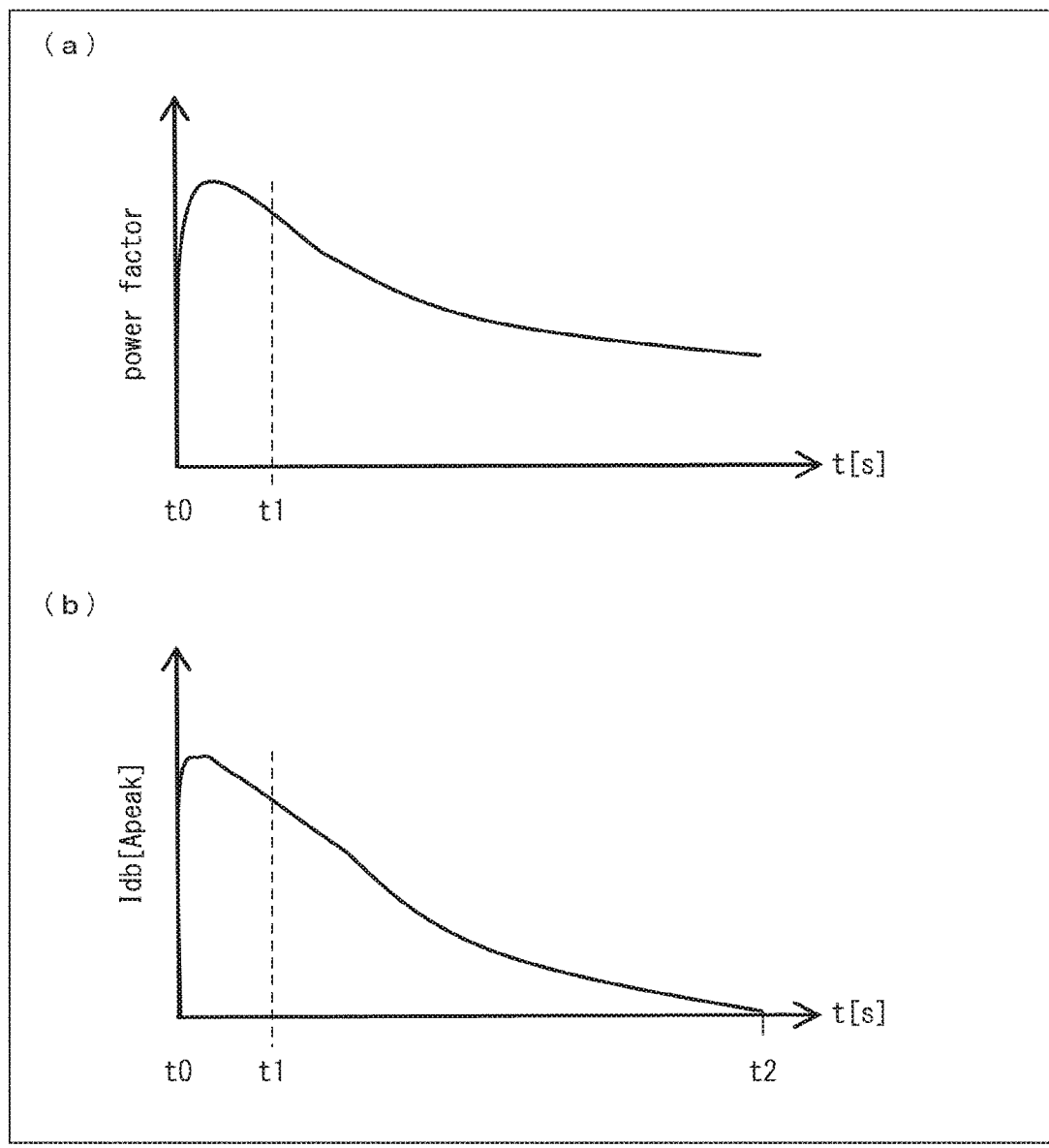
FIG. 4 shows graphs illustrating a variation in power factor and a variation in motor electric current, in a motor and a motor driving device in accordance with an aspect of the present disclosure.

FIG. 4 shows graphs illustrating an outline of a variation in power factor and an outline of a variation in motor electric current Idb, in the motor 2 and the motor driving device 11 in accordance with Embodiment 1. (a) of FIG. 4 is a graph illustrating the variation in power factor in the motor 2 and the motor driving device 11 in accordance with Embodiment 1. (b) of FIG. 4 is a graph illustrating the variation in motor electric current Idb in the motor 2 and the motor driving device 11 in accordance with Embodiment 1.

At time t0, the semiconductor switch SW1 is turned on, so that the dynamic braking starts to be carried out. Each of the power factor and the motor electric current Idb gradually decreases as the rotational speed decreases. At time t1 which is time after an elapse of the given length of time from the time t0, the mechanical switch SW2 is turned on. According to the motor driving device 11, the motor electric current Idb always flows through the first impedance circuit Z1. Therefore, there is no variation in power factor between before and after the mechanical switch SW2 is turned on (the power factor is constant). Note that a timing at which the mechanical switch SW2 is turned on is fixed. The mechanical switch SW2 is turned on after the given length of time has elapsed since the semiconductor switch SW1 was turned on. Consequently, the rotational speed of the motor 2 gradually decreases, and the motor 2 stops at time t2 (a value of the motor electric current Idb becomes 0 (zero)). In this manner, according to the motor driving device 11, since a path passing through the semiconductor switch SW1 and a path passing through the mechanical switch SW2 share an impedance circuit, the power factor monotonically decreases in a case where the power factor passes a peak immediately after a start of the dynamic braking.

Control Timing in Embodiment 2

Figure 5:
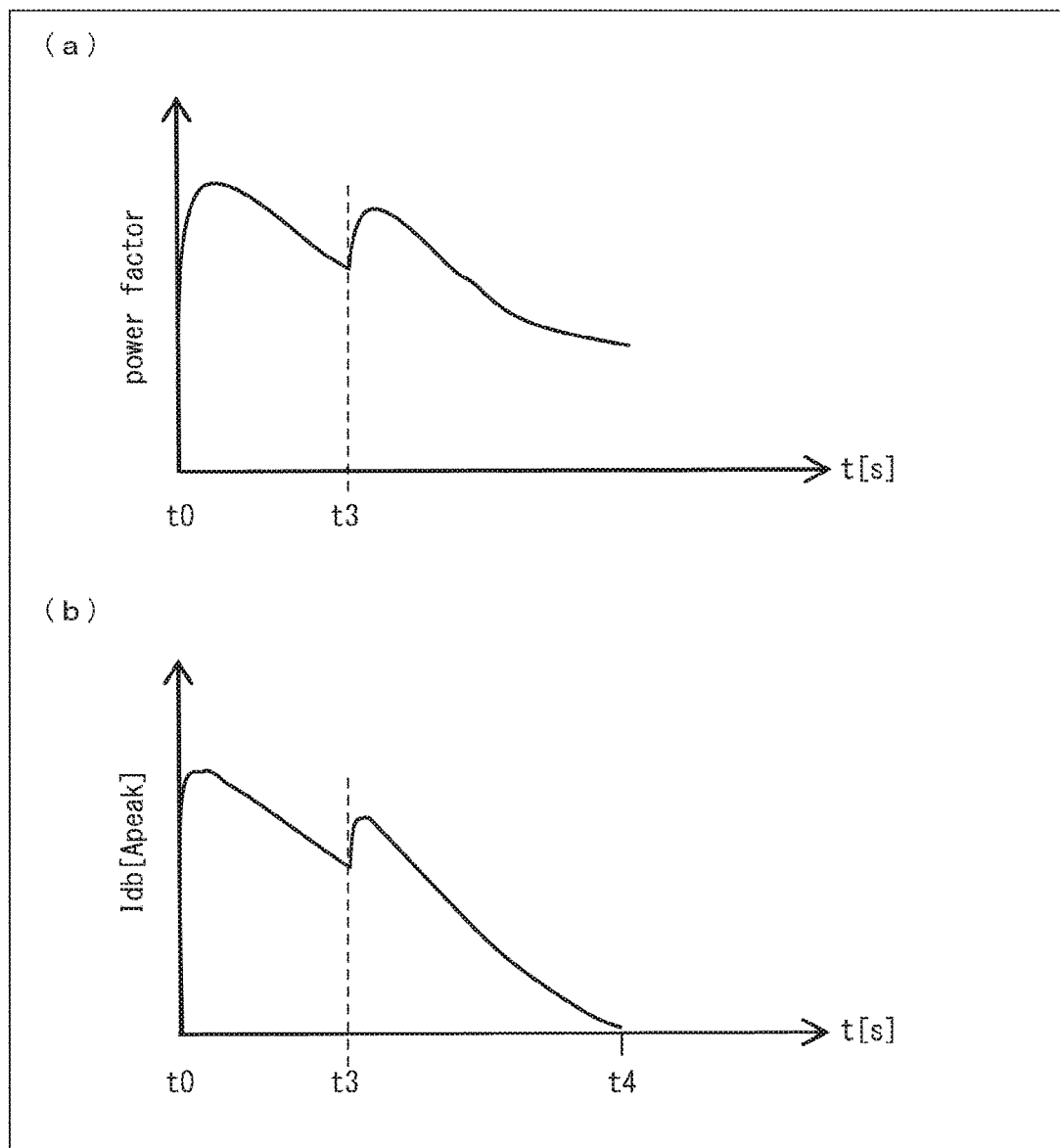
FIG. 5 shows graphs illustrating a variation in power factor and a variation in motor electric current, in a motor and a motor driving device in accordance with an aspect of the present disclosure.

FIG. 5 shows graphs illustrating an outline of a variation in power factor and an outline of a variation in motor electric current Idb, in the motor 2 and the motor driving device 12 in accordance with Embodiment 2. (a) of FIG. 5 is a graph illustrating the variation in power factor in the motor 2 and the motor driving device 12 in accordance with Embodiment 2. (b) of FIG. 5 is a graph illustrating the variation in motor electric current Idb in the motor 2 and the motor driving device 12 in accordance with Embodiment 2.

At time t0, the semiconductor switch SW1 is turned on, so that the dynamic braking starts to be carried out. Each of the power factor and the motor electric current Idb gradually decreases as the rotational speed decreases. Thereafter, in a case where the rotational speed of the motor 2 becomes equal to or lower than a given value ω1, that is, in a case where a value of the motor electric current Idb [Apeak] becomes equal to or lower than a given value (time t3), the mechanical switch SW2 is turned on. Then, after chattering ends, the semiconductor switch SW1 is turned off. Note, here, that, for convenience, the graphs show that the semiconductor switch SW1 is turned off immediately after the mechanical switch SW2 is turned on. In a case where the mechanical switch SW2 is turned on and the semiconductor switch SW1 is turned off, the path along which the motor electric current Idb flows changes from the first impedance circuit Z1 to the second impedance circuit Z2. The impedance of the second impedance circuit Z2 is set to have a value suitable for a given rotational speed ω1 (or rotational speed of not more than ω1). Therefore, after the mechanical switch SW2 is turned on, the power factor having decreased in accordance with the decrease in rotational speed increases. With this increase in power factor, the motor electric current Idb [Apeak] also increases. Thus, the braking force acting on the motor 2 also increases. It is therefore possible for the motor driving device 12 in accordance with Embodiment 2 to stop the motor 2 at time t4 which is earlier than time t2 at which the motor driving device 11 in accordance with Embodiment 1 stops the motor 2.

In this manner, the motor driving device 12 in accordance with Embodiment 2 determines a timing at which the mechanical switch SW2 is turned on, depending on the measured rotational speed. Then, the motor driving device 12 changes the path along which the motor electric current Idb flows, from the first impedance circuit Z1 having an impedance suitable for a rotational speed of higher than ω1, to the second impedance circuit Z2 having an impedance suitable for a rotational speed of not higher than ω1. In other words, the braking control circuit 5 controls the mechanical switch SW2 to be turned on at such a timing that the power factor immediately after the mechanical switch SW2 is turned on is higher than the power factor immediately before the mechanical switch SW2 is turned on. By thus improving the power factor, it is possible to efficiently apply a dynamic brake to the motor 2. Note that the rotational speed in a case where the semiconductor switch SW1 is in the ON state and the mechanical switch SW2 is in the OFF state, that is, the rotational speed at which a power factor of a circuit passing through the first impedance circuit Z1 is 1 (one) (maximum value) is greater than the rotational speed in a case where the semiconductor switch SW1 is in the OFF state and the mechanical switch SW2 is in the ON state, that is, the rotational speed at which a power factor of a circuit passing through the second impedance circuit Z2 is 1 (one) (maximum value).

Note that, in the dynamic braking, the braking control circuit 5 can control the mechanical switch SW2 to be turned on at such a timing that a maximum value (peak) of the motor electric current Idb after the mechanical switch SW2 is turned on is lower than the maximum value (peak) of the motor electric current Idb between when the semiconductor switch SW1 is turned on and when the mechanical switch SW2 is turned on. An important factor as to a life of the semiconductor switch SW1 is an amount of generated heat (accumulated consumed electric power). An important factor as to a life of the mechanical switch SW2 is a maximum electric current. Therefore, a time period during which the semiconductor switch SW1 is in the ON state is preferably shorter. Furthermore, during a time period during which the mechanical switch SW2 is in the ON state, the rotational speed of the motor 2 is preferably lower. By carrying out control at such a timing, it is possible to cause a high electric current having been generated immediately after a start of the dynamic braking (immediately after the time t0) to flow through the semiconductor switch SW1, and possible to cause a maximum value of an electric current flowing through the mechanical switch SW2 to be low. Thus, it is possible to use the mechanical switch SW2 which is low in rated electric current. That is, it is possible to use the mechanical switch SW2 which has a reduced size.

According to the motor driving device 12 in accordance with Embodiment 2, the rotational energy of the motor 2 is consumed (converted into Joule heat) mainly in the first impedance circuit Z1 and the second impedance circuit Z2 through each of which no electric current flows while the motor 2 is being ordinarily driven. Therefore, it is possible to prevent heat generation in the motor driving circuit 3 and the motor 2 during the dynamic braking. Accordingly, it is possible to extend a life of the motor driving device 12.

Variation

Figure 10:
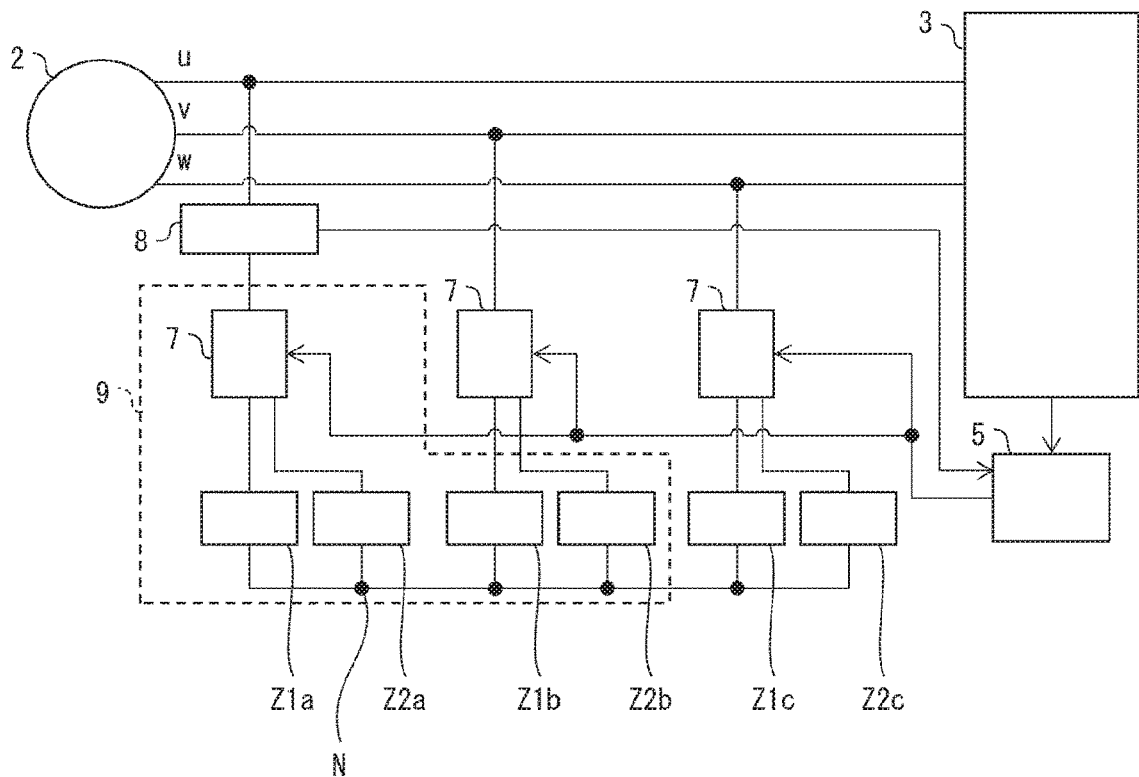
FIG. 10 is a three-phase circuit diagram illustrating a configuration of a motor driving device in accordance with an aspect of the present disclosure.

FIG. 10 is a three-phase circuit diagram illustrating a configuration of a motor driving device 12 in accordance with a variation. An impedance circuit Z1a and an impedance circuit Z2a are connected to each other in parallel, and a relay 7 and the impedance circuits Z1a and Z2a are connected in this order between a U-phase winding and a node N. An impedance circuit Z1b and an impedance circuit Z2b are connected to each other in parallel, and another relay 7 and the impedance circuits Z1b and Z2b are connected in this order between a V-phase winding and the node N. An impedance circuit Z1c and an impedance circuit Z2c are connected to each other in parallel, and further another relay 7 and the impedance circuits Z1c and Z2c are connected in this order between a W-phase winding and the node N. An impedance of each of the impedance circuits Z1a, Z1b, and Z1c is half that of the first impedance circuit Z1. An impedance of each of the impedance circuits Z2a, Z2b, and Z2c is half that of the second impedance circuit Z2. The relay 7 and the impedance circuits Z1a, Z1b, Z2a, and Z2b correspond to a dynamic braking circuit 9. A speed measuring circuit 8 measures an electric current in any one or each of the U-phase winding, the V-phase winding, and the W-phase winding.

Figure 11:
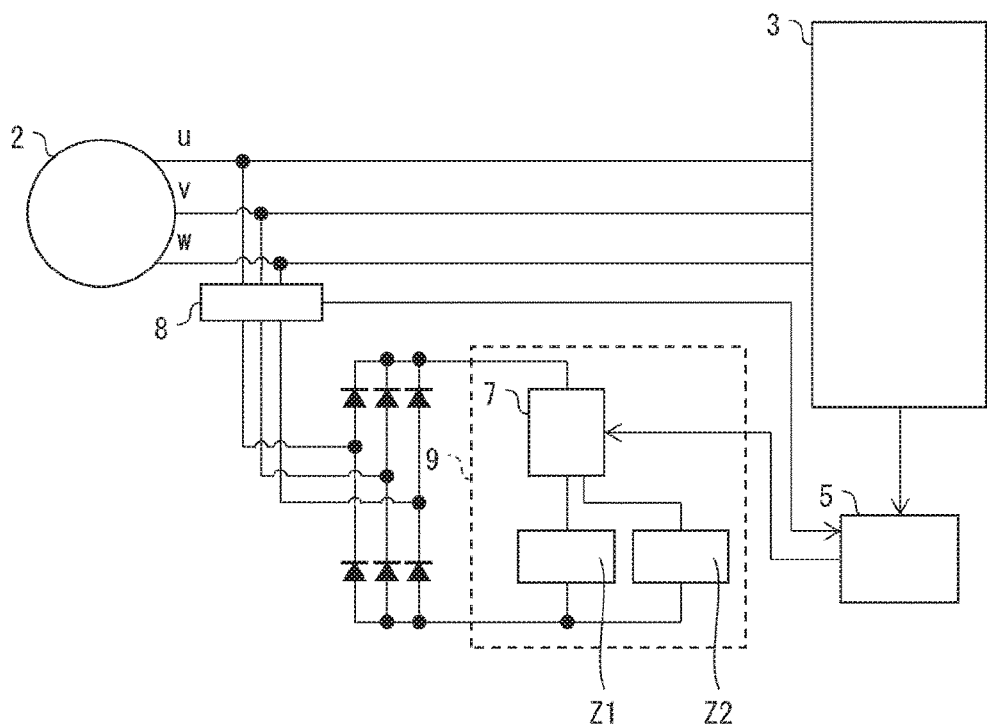
FIG. 11 is a three-phase circuit diagram illustrating a configuration of a motor driving device in accordance with an aspect of the present disclosure.

FIG. 11 is a three-phase circuit diagram illustrating a configuration of a motor driving device 12 in accordance with a variation. A diode is connected between a relay 7 and each of windings corresponding to respective phases. Another diode is connected between a first impedance circuit Z1 and the each of the windings corresponding to the respective phases. These diodes are identical to each other in direction.

Embodiment 3

Embodiment 3 of the present invention will be described below. Note that, for convenience, members having functions identical to those of members described in Embodiment 1 and 2 will be given identical reference signs, and will be not described.

Configuration of Motor Driving Device 13

Figure 6:
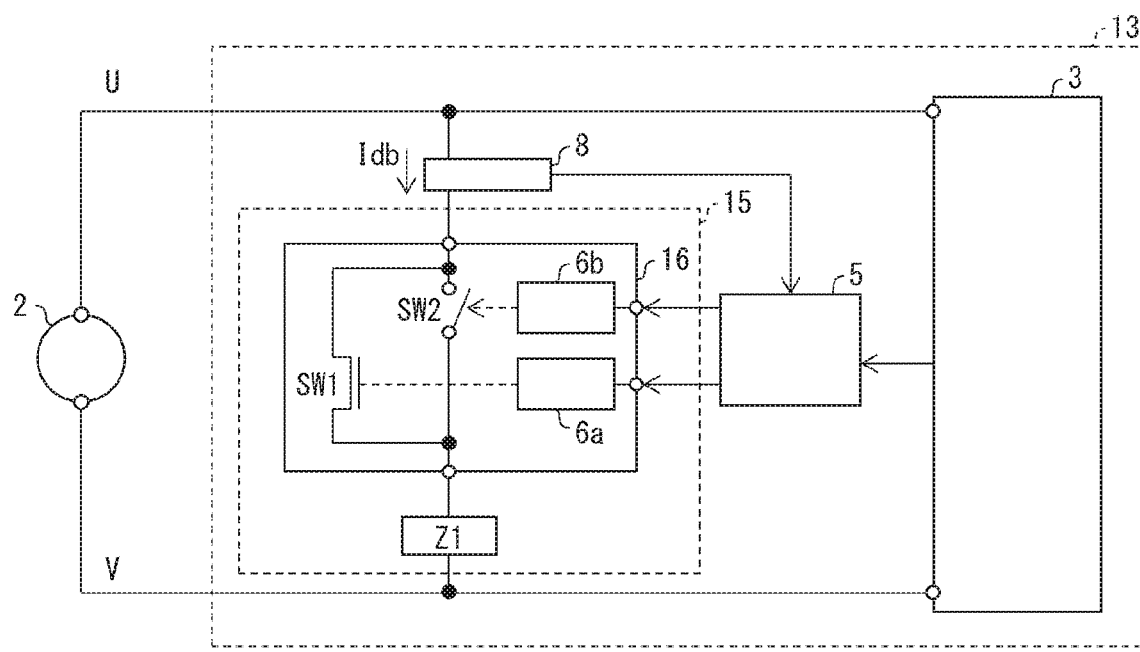
FIG. 6 is a single-phase circuit diagram illustrating a configuration of a motor driving device in accordance with an aspect of the present disclosure.

FIG. 6 is a single-phase circuit diagram illustrating a configuration of a motor driving device 13 in accordance with Embodiment 3. The motor driving device 13 drives a motor 2. The motor driving device 13 includes a motor driving circuit 3, a dynamic braking circuit 15, a braking control circuit 5 (control circuit), and a speed measuring circuit 8.

The dynamic braking circuit 15 includes a relay 16 and a first impedance circuit Z1. The relay 16 includes a semiconductor switch SW1, a mechanical switch SW2, a first control circuit 6a, and a second control circuit 6b. The first control circuit 6a controls the semiconductor switch SW1 to be turned on or off (conductive/non-conductive). The second control circuit 6b controls the mechanical switch SW2 to be turned on or off (conductive/non-conductive). The relay 16 separately has (i) an input terminal via which a control signal is inputted into the first control circuit 6a and (ii) an input terminal via which a control signal is inputted into the second control circuit 6b. The relay 16 has an external terminal which is connected to and shared by the semiconductor switch SW1 and the mechanical switch SW2.

One of ends of the semiconductor switch SW1 is connected to a U-phase winding, and the other of the ends of the semiconductor switch SW1 is connected to one of ends of the first impedance circuit Z1. One of ends of the mechanical switch SW2 is connected to the U-phase winding, and the other of the ends of the mechanical switch SW2 is connected to the one of the ends of the first impedance circuit Z1. The semiconductor switch SW1 and the mechanical switch SW2 are connected to each other in parallel. The other of the ends of the first impedance circuit Z1 is connected to a V-phase winding.

Note that a circuit similar to the dynamic braking circuit 9 can be provided between the V-phase winding and a W-phase winding.

Operation of Motor Driving Device 13

For example, in a case where a user operates an emergency stop button or an abnormality occurs in a circuit of part of the motor driving circuit 3, the motor driving circuit 3 starts to bring the motor 2 to an emergency stop. The motor driving circuit 3 stops supplying an alternating electric current to the motor 2, and outputs a braking signal to the braking control circuit 5. The braking control circuit 5 individually controls timings at which the semiconductor switch SW1 and the mechanical switch SW2 are turned on, depending on a rotational speed of the motor 2. The braking control circuit 5 having received the braking signal first outputs, to the relay 16, a control signal which causes merely the semiconductor switch SW1 to be turned on.

The first control circuit 6a controls the semiconductor switch SW1 to be turned on upon receipt of the control signal. As a result, the semiconductor switch SW1 is in an ON state, and the mechanical switch SW2 is in an OFF state. A motor electric current Idb having been generated in the motor 2 flows from the U-phase winding to the V-phase winding (or from the V-phase winding to the U-phase winding) through the semiconductor switch SW1 and the first impedance circuit Z1 of the dynamic braking circuit 15. This causes a decrease in rotational speed of the motor 2, and accordingly causes a decrease in motor electric current Idb.

Thereafter, in a case where a measured rotational speed of the motor 2 becomes equal to or lower than a first given value, the braking control circuit 5 then outputs, to the relay 16, a control signal which causes the mechanical switch SW2 to be turned on.

The second control circuit 6b controls the mechanical switch SW2 to be turned on upon receipt of the control signal. As a result, the semiconductor switch SW1 and the mechanical switch SW2 are each in the ON state. The motor electric current Idb having been generated in the motor 2 flows from the U-phase winding to the V-phase winding (or from the V-phase winding to the U-phase winding) in such a manner that (i) part of the motor electric current Idb flows through the semiconductor switch SW1 and the first impedance circuit Z1 of the dynamic braking circuit 15 and (ii) the other part of the motor electric current Idb flows through the mechanical switch SW2 and the first impedance circuit Z1 of the dynamic braking circuit 15. That is, half of the motor electric current Idb passes through the semiconductor switch SW1, and the other half of the motor electric current Idb passes through the mechanical switch SW2.

In a case where the measured rotational speed of the motor 2 becomes equal to or lower than a second given value, the braking control circuit 5 then outputs, to the relay 16, a control signal which causes the semiconductor switch SW1 to be turned off. The first control circuit 6a controls the semiconductor switch SW1 to be turned off, on the basis of the control signal. The second given value is lower than the first given value.

Control Timing in Embodiment 3

Figure 7:
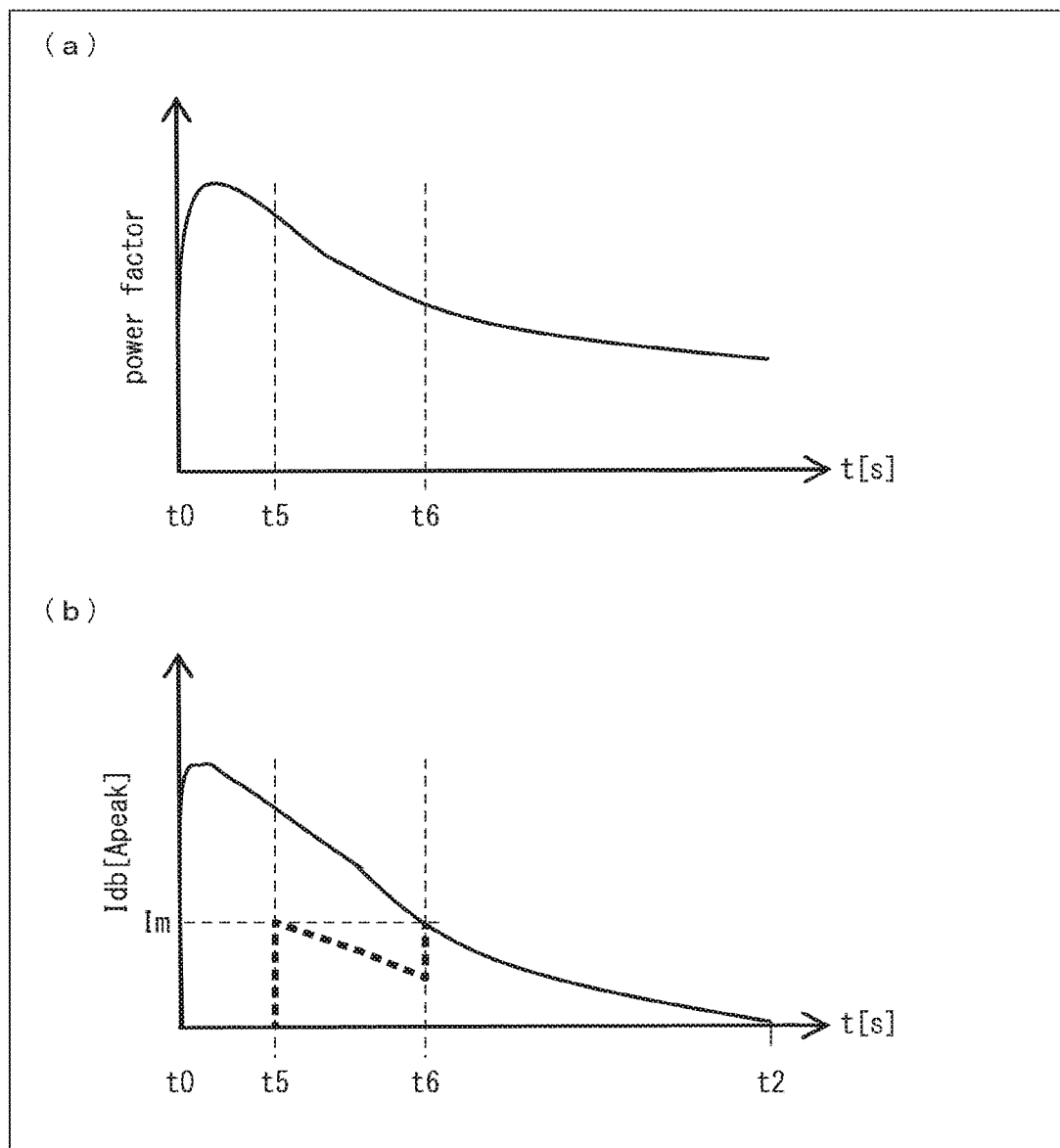
FIG. 7 shows graphs illustrating a variation in power factor and a variation in motor electric current, in a motor and a motor driving device in accordance with an aspect of the present disclosure.

FIG. 7 shows graphs illustrating a variation in power factor and a variation in motor electric current Idb, in the motor 2 and the motor driving device 13 in accordance with Embodiment 3. (a) of FIG. 7 is a graph illustrating the variation in power factor in the motor 2 and the motor driving device 13 in accordance with Embodiment 3. (b) of FIG. 7 is a graph illustrating the variation in motor electric current Idb (solid line) and a variation in electric current flowing through the mechanical switch SW2 (dotted line), in the motor 2 and the motor driving device 13 in accordance with Embodiment 3.

At time t0, the semiconductor switch SW1 is turned on, so that dynamic braking starts to be carried out. Each of the power factor and the motor electric current Idb gradually decreases as the rotational speed decreases. Thereafter, in a case where the rotational speed of the motor 2 becomes equal to or lower than the first given value ω1, that is, in a case where a value of the motor electric current Idb [Apeak] becomes equal to or lower than a third given value (time t5), the mechanical switch SW2 is turned on. The electric current flowing through the mechanical switch SW2 (dotted line) is half the motor electric current Idb. Thereafter, in a case where the rotational speed of the motor 2 becomes equal to or lower than the second given value ω2, that is, in a case where the value of the motor electric current Idb [Apeak] becomes equal to or lower than a fourth given value (time t6), the semiconductor switch SW1 is turned off. This causes all of the motor electric current Idb to flow through the mechanical switch SW2. Each of the third given value and the fourth given value is set so that the semiconductor switch SW1 is turned off when a magnitude of the motor electric current Idb becomes equal to or smaller than a magnitude Im of the electric current flowing through the mechanical switch SW2 at the time t5. That is, the fourth given value is equal to or less than half the third given value. The braking control circuit 5 controls the semiconductor switch SW1 to remain on until, at the earliest, the value of the motor electric current Idb becomes equal to or lower than a maximum value of the electric current flowing through the mechanical switch SW2 after the mechanical switch SW2 is turned on. This makes it possible to cause the maximum value of the electric current flowing through the mechanical switch SW2 to be lower. Thus, it is possible to use the mechanical switch SW2, which is low in rated electric current. Furthermore, it is possible to suppress time quadrature of an electric current flowing through the semiconductor switch SW1. It is therefore possible to suppress heat generation in the semiconductor switch SW1.

Variation

Figure 12:
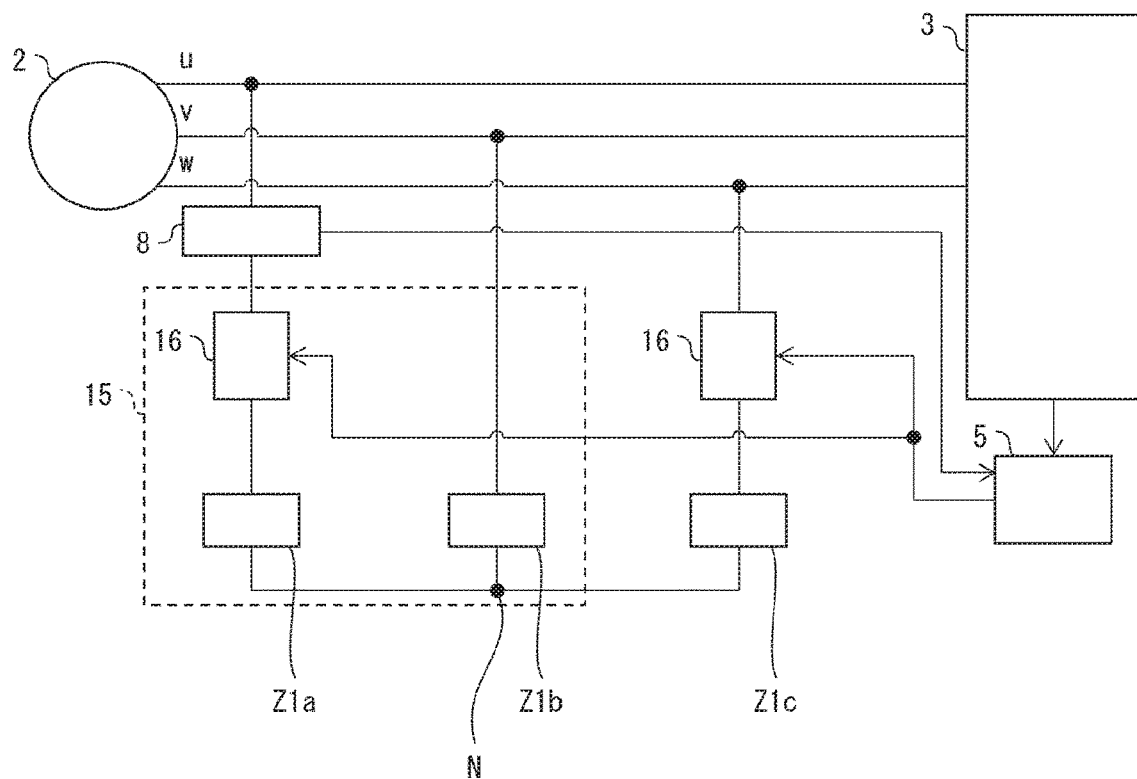
FIG. 12 is a three-phase circuit diagram illustrating a configuration of a motor driving device in accordance with an aspect of the present disclosure.

FIG. 12 is a three-phase circuit diagram illustrating a configuration of a motor driving device 13 in accordance with a variation. A relay 16, an impedance circuit Z1a, and an impedance circuit Z1b are connected in this order between a U-phase winding and a V phase winding. Another relay 16 and an impedance circuit Z1c are connected between a W-phase winding and a node N (node between the impedance circuit Z1a and the impedance circuit Z1b). An impedance of each of the impedance circuits Z1a, Z1b, and Z1c is half that of the first impedance circuit Z1. The relay 16 and the impedance circuits Z1a and Z1b correspond to a dynamic braking circuit 15.

Figure 13:
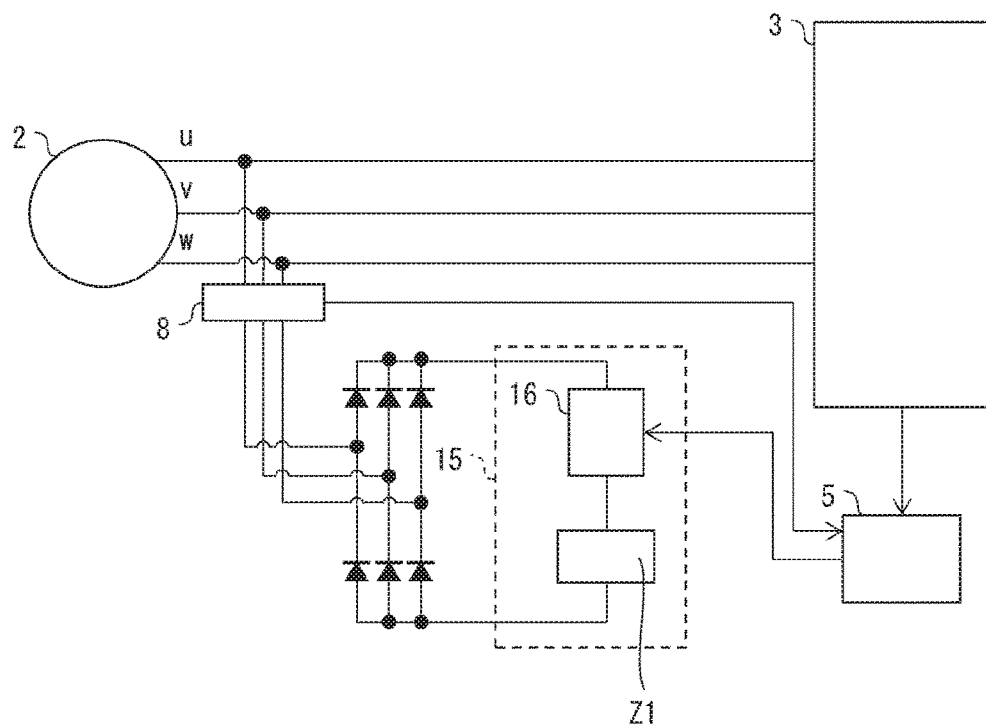
FIG. 13 is a three-phase circuit diagram illustrating a configuration of a motor driving device in accordance with an aspect of the present disclosure.

FIG. 13 is a three-phase circuit diagram illustrating a configuration of a motor driving device 13 in accordance with a variation. A diode is connected between a relay 16 and each of windings corresponding to respective phases. Another diode is connected between a first impedance circuit Z1 and the each of the windings corresponding to the respective phases. These diodes are identical to each other in direction.

Note that, as in Embodiment 2, the motor driving device 11 in accordance with Embodiment 1 and the motor driving device 13 in accordance with Embodiment 3 can be configured such that a set of the semiconductor switch SW1 and the first impedance circuit Z1 and a set of the mechanical switch SW2 and the second impedance circuit Z2 are connected to each other in parallel.

Note also that the motor driving device 12 in accordance with Embodiment 2 can be arranged such that the semiconductor switch SW1 is caused to remain on even after the mechanical switch SW2 is turned on. For example, the semiconductor switch SW1 can be caused to remain on until the motor 2 stops.

Recapitulation

A motor driving device in accordance with an aspect of the present disclosure is a motor driving device which drives a motor, including: a motor driving circuit configured to supply an alternating electric current to the motor so that the motor is driven; and a dynamic braking circuit provided between windings of the motor which windings correspond to respective two phases, the dynamic braking circuit including: a mechanical switch configured to cause a short circuit between the windings corresponding to the respective two phases; a semiconductor switch connected to the mechanical switch in parallel and configured to cause a short circuit between the windings corresponding to the respective two phases; and a first impedance circuit connected to the semiconductor switch in series.

According to the above configuration, it is possible to apply a dynamic brake, by causing a short circuit between the windings of the motor, which windings correspond to the respective two phases, with use of the semiconductor switch and the first impedance circuit. It is possible to suppress heat generation in the semiconductor switch, by providing the first impedance circuit so that the first impedance circuit is connected to the semiconductor switch in series. Furthermore, it is possible to suppress heat generation in the semiconductor switch, by causing a short circuit between the windings, which correspond to the respective two phases, with use of the mechanical switch. It is therefore possible to extend a life of the motor driving device.

The first impedance circuit can include a resistor connected to the semiconductor switch in series The first impedance circuit can include a capacitor element connected to the resistor in parallel.

According to the above configuration, it is possible to appropriately set an impedance of a path including the motor and the dynamic braking circuit, in consideration of a coil element of the motor.

The motor driving device can be arranged so as to further include a control circuit configured to control the semiconductor switch and the mechanical switch to be turned on or off, in dynamic braking, the control circuit controlling the semiconductor switch to be turned on and then controlling the mechanical switch to be turned on.

According to the above configuration, it is possible to suppress an arc discharge which occurs when the mechanical switch is turned on, and possible to extend a life of the mechanical switch.

The motor driving device can be arranged such that in the dynamic braking, the control circuit controls the semiconductor switch to be turned on and then, after a given length of time, controls the mechanical switch to be turned on.

The motor driving device can be arranged so as to further include a speed measuring circuit configured to measure a rotational speed of the motor, in the dynamic braking, the control circuit controlling the semiconductor switch to be turned on and then, in a case where a measured rotational speed becomes equal to or lower than a given value, controlling the mechanical switch to be turned on.

According to the above configuration, it is possible to turn on the mechanical switch at a timing corresponding to the rotational speed of the motor, that is, a timing corresponding to a frequency of a motor electric current. This makes it possible to suitably control a maximum value of an electric current flowing through the mechanical switch. It is therefore possible to extend the life of the mechanical switch.

The motor driving device can be arranged such that the speed measuring circuit is configured to measure a motor electric current flowing through the motor; and in the dynamic braking, the control circuit controls the mechanical switch to be turned on at such a timing that a maximum value of the motor electric current after the mechanical switch is turned on is lower than the maximum value of the motor electric current from when the semiconductor switch is turned on to when the mechanical switch is turned on.

According to the above configuration, it is possible to suitably control the maximum value of the electric current flowing through the mechanical switch.

The motor driving device can be arranged such that in the dynamic braking, the control circuit controls the semiconductor switch to remain on after the control circuit controls the mechanical switch to be turned on, until, at the earliest, a value of the motor electric current flowing through the motor becomes equal to or lower than a maximum value of an electric current flowing through the mechanical switch after the mechanical switch is turned on.

According to the above configuration, it is possible to cause the maximum value of the electric current flowing through the mechanical switch to be lower.

The motor driving device can be arranged such that in the dynamic braking, the control circuit controls the semiconductor switch to remain on after the control circuit controls the mechanical switch to be turned on, until the motor stops.

According to the above configuration, it is possible to cause the maximum value of the electric current flowing through the mechanical switch to be lower.

The motor driving device can be arranged such that in the dynamic braking, the control circuit controls the mechanical switch to be turned on at such a timing that a power factor immediately after the mechanical switch is turned on is higher than the power factor immediately before the mechanical switch is turned on.

According to the above configuration, even in a case where the rotational speed of the motor decreases, it is possible to apply an appropriate braking force to the motor by turning on the mechanical switch.

The motor driving device can be arranged such that the dynamic braking circuit further includes a second impedance circuit connected to the mechanical switch in series; and a set of the semiconductor switch and the first impedance circuit and a set of the mechanical switch and the second impedance circuit are connected to each other in parallel.

The motor driving device can be arranged such that an impedance of the first impedance circuit and an impedance of the second impedance circuit are different from each other.

According to the above configuration, it is possible to cause an impedance of a path including the motor in a case where the semiconductor switch is turned on to be different from an impedance of a path including the motor in a case where the mechanical switch is turned on. It is therefore possible to apply an appropriate braking force in accordance with the rotational speed of the motor.

The motor driving device can be arranged such that the mechanical switch is connected to the first impedance circuit in series.

According to the above configuration, an impedance of a path along which the motor electric current flows does not depend on whether the semiconductor switch and the mechanical switch are turned on or off. This makes it easy to control a braking force, and makes it easy to set the control circuit.

The present invention is not limited to the embodiments, but can be altered by a skilled person in the art within the

REFERENCE SIGNS LIST

2 Motor
3 Motor driving circuit
4, 9, 15 Dynamic braking circuit
5 Braking control circuit (control circuit)
6, 7, 16 Relay
6a First control circuit
6b Second control circuit
8 Speed measuring circuit
11, 12, 13 Motor driving device
SW1 Semiconductor switch
SW2 Mechanical switch
Z1 First impedance circuit
Z2 Second impedance circuit

The invention claimed is:

1. A motor driving device which drives a motor, comprising:
- a motor driving circuit configured to supply an alternating electric current to the motor so that the motor is driven;
- a dynamic braking circuit provided between windings of the motor which windings correspond to respective two phases; and
- a control circuit, wherein:
- the dynamic braking circuit comprises:
  - a mechanical switch configured to cause a short circuit between the windings corresponding to the respective two phases;
  - a semiconductor switch connected to the mechanical switch in parallel and configured to cause a short circuit between the windings corresponding to the respective two phases;
  - a first impedance circuit connected to the semiconductor switch in series; and
  - a second impedance circuit connected to the mechanical switch in series;
- the control circuit controls the semiconductor switch and the mechanical switch to be turned on or off;
- in dynamic braking, the control circuit controls the semiconductor switch to be turned on and then controlling the mechanical switch to be turned on;
- a set of the semiconductor switch and the first impedance circuit and a set of the mechanical switch and the second impedance circuit are connected to each other in parallel; and
- in the dynamic braking, the control circuit controls the semiconductor switch to remain on after the control circuit controls the mechanical switch to be turned on, until, at the earliest, a value of the motor electric current flowing through the motor becomes equal to or lower than a maximum value of an electric current flowing through the mechanical switch after the mechanical switch is turned on.

2. The motor driving device as set forth in claim 1, wherein the first impedance circuit includes a resistor connected to the semiconductor switch in series.

3. The motor driving device as set forth in claim 2, wherein the first impedance circuit includes a capacitor element connected to the resistor in parallel.

4. The motor driving device as set forth in claim 2, wherein in the dynamic braking, the control circuit controls the semiconductor switch to be turned on and then, after a given length of time, controls the mechanical switch to be turned on.

5. The motor driving device as set forth in claim 2, further comprising
a speed measuring circuit configured to measure a rotational speed of the motor,
in the dynamic braking, the control circuit controlling the semiconductor switch to be turned on and then, in a case where a measured rotational speed becomes equal to or lower than a given value, controlling the mechanical switch to be turned on.

6. The motor driving device as set forth in claim 3, wherein in the dynamic braking, the control circuit controls the semiconductor switch to be turned on and then, after a given length of time, controls the mechanical switch to be turned on.

7. The motor driving device as set forth in claim 3, further comprising
a speed measuring circuit configured to measure a rotational speed of the motor,
in the dynamic braking, the control circuit controlling the semiconductor switch to be turned on and then, in a case where a measured rotational speed becomes equal to or lower than a given value, controlling the mechanical switch to be turned on.

8. The motor driving device as set forth in claim 1, wherein in the dynamic braking, the control circuit controls the semiconductor switch to be turned on and then, after a given length of time, controls the mechanical switch to be turned on.

9. The motor driving device as set forth in claim 1, further comprising
a speed measuring circuit configured to measure a rotational speed of the motor,
in the dynamic braking, the control circuit controlling the semiconductor switch to be turned on and then, in a case where a measured rotational speed becomes equal to or lower than a given value, controlling the mechanical switch to be turned on.

10. The motor driving device as set forth in claim 9, wherein:
the speed measuring circuit is configured to measure a motor electric current flowing through the motor; and
in the dynamic braking, the control circuit controls the mechanical switch to be turned on at such a timing that a maximum value of the motor electric current after the mechanical switch is turned on is lower than the maximum value of the motor electric current from when the semiconductor switch is turned on to when the mechanical switch is turned on.

11. The motor driving device as set forth in claim 1, wherein in the dynamic braking, the control circuit controls the semiconductor switch to remain on after the control circuit controls the mechanical switch to be turned on, until, at the earliest, a value of the motor electric current flowing through the motor becomes equal to or lower than a maximum value of an electric current flowing through the mechanical switch after the mechanical switch is turned on.

12. The motor driving device as set forth in claim 1, wherein in the dynamic braking, the control circuit controls the semiconductor switch to remain on after the control circuit controls the mechanical switch to be turned on, until the motor stops.

13. The motor driving device as set forth in claim 1, wherein in the dynamic braking, the control circuit controls the mechanical switch to be turned on at such a timing that a power factor immediately after the mechanical switch is turned on is higher than the power factor immediately before the mechanical switch is turned on.

14. The motor driving device as set forth in claim 1, wherein an impedance of the first impedance circuit and an impedance of the second impedance circuit are different from each other.

15. The motor driving device as set forth in claim 1, wherein the mechanical switch is connected to the first impedance circuit in series.

* * * * *